Figure 1:
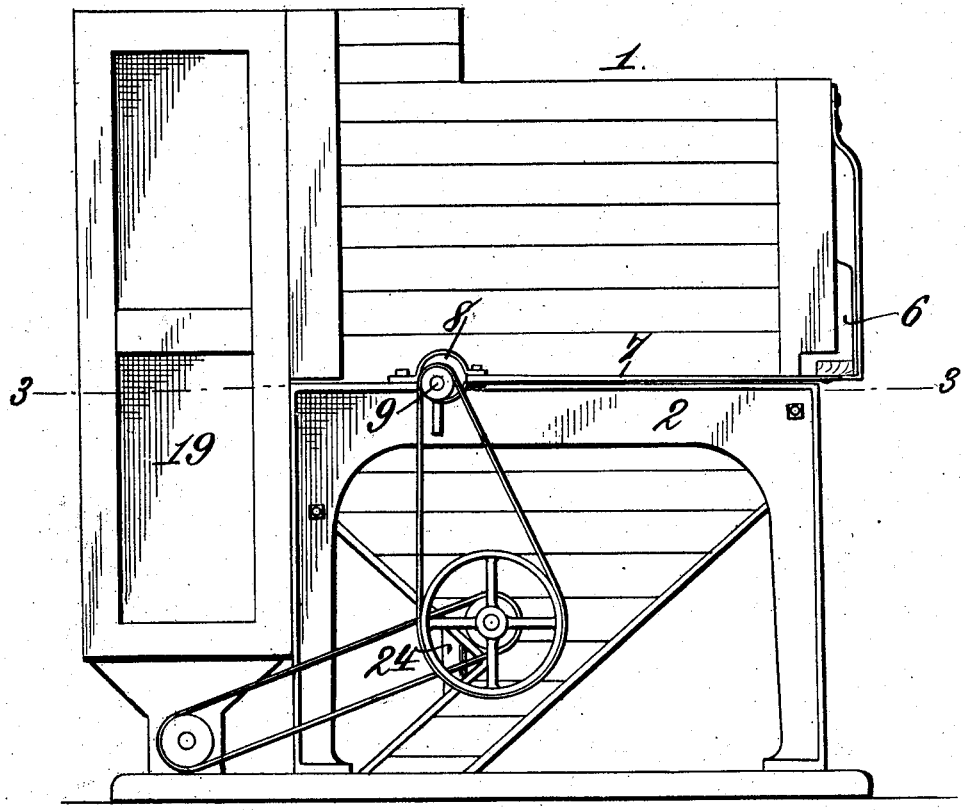

No. 760,901. PATENTED MAY 24, 1904.
J. E. MITCHELL.
GRAIN SEPARATOR.
APPLICATION FILED SEPT. 16, 1903.
NO MODEL. 2 SHEETS—SHEET 1.

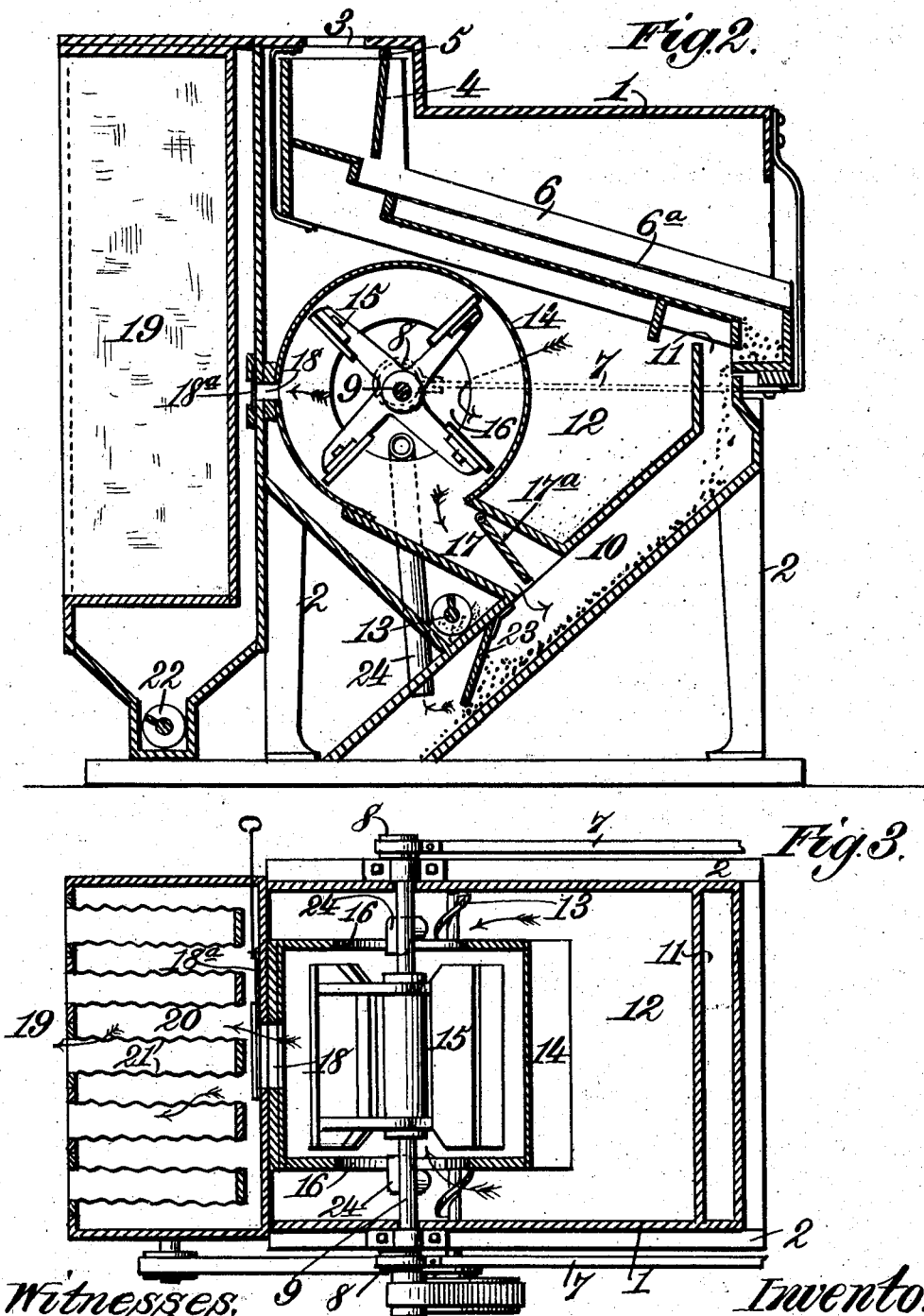

No. 760,901.

Patented May 24, 1904.

UNITED STATES PATENT OFFICE.

JOHN ELVIN MITCHELL, OF ST. LOUIS, MISSOURI.

GRAIN-SEPARATOR.

SPECIFICATION forming part of Letters Patent No. 760,901, dated May 24, 1904.

Application filed September 16, 1903. Serial No. 173,407. (No model.)

*To all whom it may concern:*

Be it known that I, JOHN ELVIN MITCHELL, a citizen of the United States, residing at St. Louis, in the State of Missouri, have invented new and useful Improvements in Grain-Separators, of which the following is a specification.

My invention relates to improvements in endless-air-current machines for separating dust and other foreign matter from grain, and has for its object to provide a machine in which a part only of the dust-laden current in a filtered condition is discharged to the atmosphere and its place taken by fresh air drawn by the current-creating device into the machine through the grain inlet and discharge openings, whereby escape of dust at such openings is prevented, the air-current kept fresh, and undue heating thereof avoided.

To the end stated the invention consists in a machine for separating dust and other foreign matter from grain, as hereinafter set forth and claimed.

Figure 1 is an end or side view of a machine embodying my invention. Fig. 2 is a vertical sectional view of the same, and Fig. 3 is a horizontal sectional view taken on the line 3 3 of Fig. 1.

In the following description and the claims appended thereto I shall for convenience make use of the term "dust-laden" as including air not only laden with dust, but with other foreign matter of which the grain may be cleaned by the endless air-current.

In the accompanying drawings the reference-numeral 1 designates a casing, which may be of any suitable form or construction, to house the contained elements and constituting an endless air-trunk returning the current of air to the air-creating device. This casing may be supported by any suitable character of frames or standards 2. An inlet 3 is provided in the housing, through which the grain to be cleaned is admitted to the machine, and the passage of the grain from said inlet to the operative elements of the machine may be regulated by any suitable type of valve 4. Suspended in the housing by any suitable or known construction of hangers 5 in position to receive the incoming grain is a vibratory shoe 6, which may be of any known or suitable type and which is provided with a preliminary sieve or screen $6^a$, through the meshes of which the grain may pass. The shoe 6 is vibrated in any suitable way—such, for instance, as by straps 7, connected thereto and to eccentric devices 8, arranged at the opposite ends of the shaft 9 and operated by said shaft. The grain as it leaves the tail end of the vibratory shoe is discharged into a conduit 10, provided in the housing of the machine, which conduit feeds the grain through the air-current, hereinafter referred to, and discharges it from the machine into a suitable receptacle or elsewhere, as may be desired. Communicating with the conduit 10 by a passage 11 is a settling-chamber 12, that may be provided with a suitable conveyer 13 for removing from the machine the dust which settles to the bottom thereof.

Within the casing of the machine is arranged a case 14, in which is arranged an air-current-creating device, shown as a fan 15, (of which there may be any suitable number,) mounted on the shaft 9. The case 14 communicates, as at 16, with the settling-chamber 12 and has free unobstructed communication by a passage 17 with the grain-conduit 10, through which the air-current is sent to said conduit, thence through the settling-chamber and back to the fan-case, establishing through the machine an endless air-current which takes up the dust from the grain and carries it to the settling-chamber, where the heavier matter precipitates to the bottom and is carried away by the conveyer 13. The current of air that passes through the settling-chamber has, moreover, considerable lighter dust which does not precipitate in said chamber and which it is desirable to keep separate from the heavier particles, the latter in large part consisting of inferior grain and foreign matter nearly as heavy as the good grain. In order to remove the lighter dust from the air-current so that it will not again pass into contact with the grain with the possibility of adhering thereto and at the same time to avoid the necessity of filtering the entire current of air in a large and expensive filtering-machine capable of handling and filtering the entire air-current, I provide means for discharging a part only of the dust-laden air-current in a filtered condition into the atmosphere, which means in the present embodiment of my invention consists in a provision for tapping the air-current to remove a portion of the dust-laden air therefrom and deliver it to a filtering media by which it is cleaned and discharged into the atmosphere. At the same time fresh air to take the place of that discharged is drawn into the machine through the grain inlet and discharge openings by the suction of the current-creating device, which incoming supply of fresh air prevents dust from escaping into the atmosphere at such grain inlet and discharge openings, and, furthermore, serves to keep the air-current fresh and prevent undue heating thereof. This is accomplished, according to the illustrated and best-known example of my invention, by providing an auxiliary discharge 18, preferably of lesser capacity than the main discharge 17 of the fan-case and leading to the hereinafter-referred-to dust-laden air-filter. I consider this the best point at which to tap the air-current, but do not limit my invention to the tapping of the current at this point, as the same results can be obtained, though perhaps with not so good result, by tapping the current at some other point in the machine. In the arrangement shown the air-current tap 18 is in terms of the line of travel of the air-current arranged in advance of the fan-discharge 17 to permit the passage of a portion of the dust-laden air to the filter. This tap may be regulated in respect of its area by any suitable type of valve 18ª, so as to discharge a greater or lesser relative portion of the dust-laden air-current to suit different circumstances which may develop in the practical operation of machines embodying my invention. The air-filtering device 19 is open to the atmosphere to discharge the filtered air thereinto and may be arranged within the housing of the machine or attached thereto or communicating therewith in any suitable way and, in connection with the air-separating portion of my improved machine, constitutes a complete and efficient and at the same time compact apparatus for thoroughly cleaning the grain. The air-filter referred to may be of any suitable or known type. Preferably it is composed of a series of pockets 20, comprising filtering media 21, through which the air is discharged to the atmosphere, as shown by the arrow in Fig. 3 of the drawings, the dust being intercepted by the fabric and falling to the bottom of the chamber in which such pockets are arranged, from whence it may be taken by any suitable type of conveyer 22. To provide against the current of air discharged by the fan through its main discharge 17 becoming divided and one part going to the settling-chamber and the other following the course of exit of the grain, a gate 23 of any suitable character, preferably a gravity gate, is arranged in the grain-conduit 10, as shown. The grain-inlet is under the influence of the fan, and the discharge of the grain-conduit 10 is in communication with said fan by means of the passage 24. By reason of the discharge of a part only of the air-current, as above described, a suction at this opening is created by the fan, which suction results in preventing the escape of dust at these points and the supply to the air-current of a fresh quantity of air to take the place of that discharged, keeping the current fresh and preventing undue heating thereof.

In operation the grain is introduced into the machine through the inlet 3 and passes onto and through the sieve or screen 6ª thereof and is discharged into the conduit 10. A current of air is discharged by the fan through its main discharge 16 and sent on its endless circuit through the grain-conduit 10 and settling-chamber 12 back again to itself. In passing through the conduit 10 the current of air separates the dust from the grain and carries it to the settling-chamber, where expansion of air takes place and the heavier dust precipitates or settles to the bottom and is carried away by the conveyer 13. The lighter dust still remains in the air and in the illustrated example of my invention goes to the fan, where by the centrifugal action of the latter the dust in large measure occupies the outer strata of air and is passed, with a portion only of the current of air, through the supplemental discharge into the air-filter, where it is cleaned, the cleansed air going to the atmosphere and the intercepted dust settling to the bottom of the chamber in which the air-filter is located and being conducted away by the conveyer arranged therein. After the grain in its passage through the conduit has passed the gate it comes again under the influence of the suction of the fan by means of the passage 24, where dust (if any) that has escaped the action of the main current of air, together with fresh air, is caused to pass to the fan, allowing the grain to be discharged in a perfectly clean condition and preventing escape of dust at this point. The grain-inlet is also under the influence of the suction of the fan, which suction prevents escape of dust there and also draws fresh air into the machine through said inlet.

It has been found in the practical operation of endless-air-current grain-cleaning machines where the precipitation that occurs in a settling-chamber is relied upon to relieve the air of dust that the lighter particles of dust are carried through the circuit of the machine a number of times until there is sufficient accumulation thereof to cause precipitation, and before this comes to pass there is liability of the air becoming so heavily laden with dust that some of the latter will adhere to the grain through which it passes. Furthermore, the grain which is to be cleaned is accompanied by considerable inferior grain and foreign matter nearly as heavy as the good grain which is precipitated in the settling-chamber and from which it is desirable to keep the lighter dust taken up by the current of air separate. This cannot be accomplished in an endless-air-current cleaning-machine where the settling-chamber alone is relied upon to free the air of dust. Again, in practical operation the air-current is liable to become overheated by its constant motion and fouled because of its confinement and repeated use.

In those prior machines for separating dust from grain where an endless current of air is utilized and the entire current passed to a filtering-machine the operation has been found unsatisfactory by reason of the fact that the working of the machine depends upon the filtering capacity of the cloth or other material used for filtering the air, and such filtering material in a short time becomes clogged and the pores fill up to such an extent that the air cannot be readily forced through. This results in the gradual diminishing of the volume of the endless air-current which is to do the work of removing the dust from the grain, requiring from time to time a stoppage of work in order that the filtering media may be cleaned of the dust accumulated thereon. This diminution of the volume of the working air-current results in objectionable variation in the work done and the results obtained thereby. According to my invention, however, where only a part of the air-current is filtered and discharged to the atmosphere variation in the volume of air is impossible, because the main circuit which does the work has at all times a free and unobstructed path through the machine. Furthermore, in such previous endless-air-current separating-machine the current of air, variable as it is, is passed again and again through the machine, becoming foul and unduly heated. This is avoided by my invention, wherein a part of the air is drawn off from the circuit for the purpose of causing the current-creating device to draw in a fresh supply of air at the opening points in the circuit, preventing escape of dust to the atmosphere at those points and keeping the air-current fresh and avoiding undue heating thereof. The withdrawn portion of the air-circuit is filtered and delivered to the atmosphere free of dust, and since the amount of air to be filtered is small the use of a small and compact filter in connection with the machine is possible instead of the large and expensive filtering-machines necessary to handle the entire volume of air-current, as heretofore used. By my invention all these possibilities of difficulty in previously-known endless-air-current cleaning-machines are avoided. The heavier particles of foreign matter or inferior grain are precipitated promptly in the settling-chamber, the lighter dust remaining suspended, thus effecting a separation of the different kinds of foreign substances of which the grain is cleansed. A portion of the dust-laden current of air is discharged into the atmosphere in a filtered condition and its place taken by a fresh supply of air, the entrance of which through open places in the circuit prevents the escape of dust at those points.

Again, in the particular embodiment of my invention shown since a portion only of the air-current goes to the filter the necessity of an expensive dust-collector capable of handling and filtering the entire current of air and such as is commonly used in connection with grain-cleaning machines and which would be necessary to filter the large volume of air if it were all discharged from the fan for that purpose is avoided. Furthermore, the discharge of a portion of the dust-laden air from the circuit and the replenishing of the current by fresh air to take the place of that discharged results in the avoidance of possibility of the air becoming overheated and fouled, and therefore in the carrying out of the operation on hygienic principles.

By my invention I provide a compact grain-cleaning machine which operates to thoroughly clean the grain in a simple, economical, and hygienic manner, dispensing with the expensive space-occupying dust-collecting devices which are now in common use for filtering the air discharged from grain-cleaning machines and preventing escape of dust into the atmosphere through the grain inlet and discharge openings.

If desired, an adjustable air controller or regulator 17ª may be interposed in the discharge-passage 17 from the current-creating device to the grain-conduit in order to regulate the quantity or volume of air passing through the said discharge-passage. By opening the air controller or regulator 17ª a greater volume of air will be circulated through the machine in order to secure a relatively great lifting power of said air. By closing the air-controller the volume of the air will be decreased, the lifting power of the circuit of air being correspondingly decreased. This feature is desirable and will be of utility in many cases, depending upon the particular characteristics of the grain to be treated or the foreign matter to be separated therefrom.

What I claim is—

1. In a grain-separator, the combination of a current-creating device, a casing constituting an endless air-conduit returning the current to said device, means for feeding the grain through the air-current to separate the dust and other impurities therefrom, openings into the conduit for the passage of the grain and inlet of fresh air into the circuit, means for discharging a part of the dust-laden air from the circuit and creating a suction or inward current of fresh air through the openings into the conduit, and means for filtering the dust-laden air discharged from the circuit to separate the dust therefrom.

2. In a grain-separator, the combination of a current-creating device, a casing constituting an endless air-trunk returning the current to said device, means for feeding the grain through the air-current to separate the dust and other impurities therefrom, openings into the conduit for the passage of the grain and inlet of fresh air into the circuit, an air-filter open to the atmosphere, and a passage tapping the air-trunk and leading to the filter, whereby part of the dust-laden air is conducted into the filter.

In testimony whereof I have hereunto set my hand in presence of two subscribing witnesses.

JOHN ELVIN MITCHELL.

Witnesses:
J. N. BONNER,
MARK MAITLAND.